United States Patent [19]

Moran et al.

[11] Patent Number: 4,681,176

[45] Date of Patent: Jul. 21, 1987

[54] PRODUCT HANDLING AND WEIGHING APPARATUS

[75] Inventors: Michael J. Moran, Raleigh; Tadeusz Kemnitz, Durham, both of N.C.

[73] Assignee: 501 USM Corporation, Farmington, Conn.

[21] Appl. No.: 892,669

[22] Filed: Aug. 1, 1986

[51] Int. Cl.$^4$ .................... G01G 13/24; G01G 19/00
[52] U.S. Cl. .................................. 177/114; 177/145
[58] Field of Search ............................ 177/114, 145

[56] References Cited

U.S. PATENT DOCUMENTS

| | | | |
|---|---|---|---|
| 2,641,459 | 6/1953 | McHale et al. | 177/145 |
| 3,539,028 | 11/1970 | Krolopp | 177/114 X |
| 4,130,171 | 12/1978 | Smith et al. | 177/25 X |

Primary Examiner—George H. Miller, Jr.

[57] ABSTRACT

A product handling and weighing apparatus having a rotary paddle wheel with vanes forming product pockets therebetween to hold the product and transfer the product through a weighing bucket.

7 Claims, 1 Drawing Figure

PRODUCT HANDLING AND WEIGHING APPARATUS

BACKGROUND OF THE INVENTION

1. Field of the Invention

This invention relates to an apparatus having a rotary paddle wheel with vanes for receiving the product from a source and transporting the product through a weighing bucket to the funnel of a bagger.

2. Summary of the Prior Art

This invention is in the field of computerized scales having a series of weighing buckets each associated with an underlying load cell for producing an electrical signal representative of the weight of the product in the bucket. The weight of the product in each bucket is less than the total weight of the product to be packaged.

With all the buckets filled, a computer would respond to the weight signals of the load cells, select the right combination of buckets having the desired minimum weights and the buckets involved are then emptied.

Weighing buckets for conventional commercially available computer scales include doors which move to open positions to dump the product from the buckets after the product has been weighed. Because of the door and the need to open the weighing bucket, the rigidity of the bucket is reduced and its natural frequency is decreased. While high frequency disturbances in the bucket can be electronically filtered from the load cell signal in a relatively easy manner, low frequency disturbances resulting from a door-type bucket having a relatively low natural frequency are more difficult to eliminate and can result in inaccurate readings. In addition, the door of such a weighing bucket must close before the bucket can be re-filled and thus the time required for closing the door increases the time required for the overall weighing cycle.

One approach to emptying the weighing bucket and eliminating the aforementioned undesirable results is disclosed in commonly owned U.S. Pat. No. 4,591,012 which shows using air to empty the weighing bucket.

SUMMARY OF THE INVENTION

It is the general object of this invention to provide a means for passing a product through a weighing bucket that can be used to handle fragile products such as pretzels as well as other snack food products.

The objects of this invention are accomplished by providing a rotary paddle wheel with vanes for receiving the product from a source and passing the product through a weighing bucket to a chute, for example, of a bagger. The paddle wheel is supported separate from the bucket so that the bucket can be rigid and stiff with a high natural frequency to reduce the low frequency disturbances affecting the weight signal to obtain a more accurate scale.

It is also an object of this invention to pass a product through a weighing bucket by a rotary paddle wheel having vanes which clean the bucket and refill the bucket with the product. The vanes are spaced and have smooth line contact so that the product being handled does not fall directly against any surface thus, minimizing the impact against the product during handling.

It is also an object of this invention to provide in a scale a rotary paddle wheel for supplying a product to a weighing bucket, the wheel having vanes forming product accumulating and holding pockets therebetween. The wheel upon rotation can quickly pass the product through the weighing bucket, clean the bucket and refill the bucket immediately making a continuously operating scale.

It is a further object of this invention to collect a product from a source in a rotary paddle wheel which has spaced vanes forming accumulating and holding pockets for the product. The wheel, upon rotation, will bring the product down into a weighing bucket in two steps from the accumulating to the holding position for gentle handling of the product before being placed in the weighing bucket.

It is a further object of this invention to transfer a product out of a weighing bucket by a rotary paddle wheel having a vane that gently sweeps a fragile product out of the bucket by a vector action for further downstream processing. The bucket has side walls connected by a bottom formed on an arcuate surface drawn on a radius from the center of the wheel so that the vane cleans the bucket of all product as the wheel rotates.

DESCRIPTION OF THE PREFERRED EMBODIMENT

Figure 1:
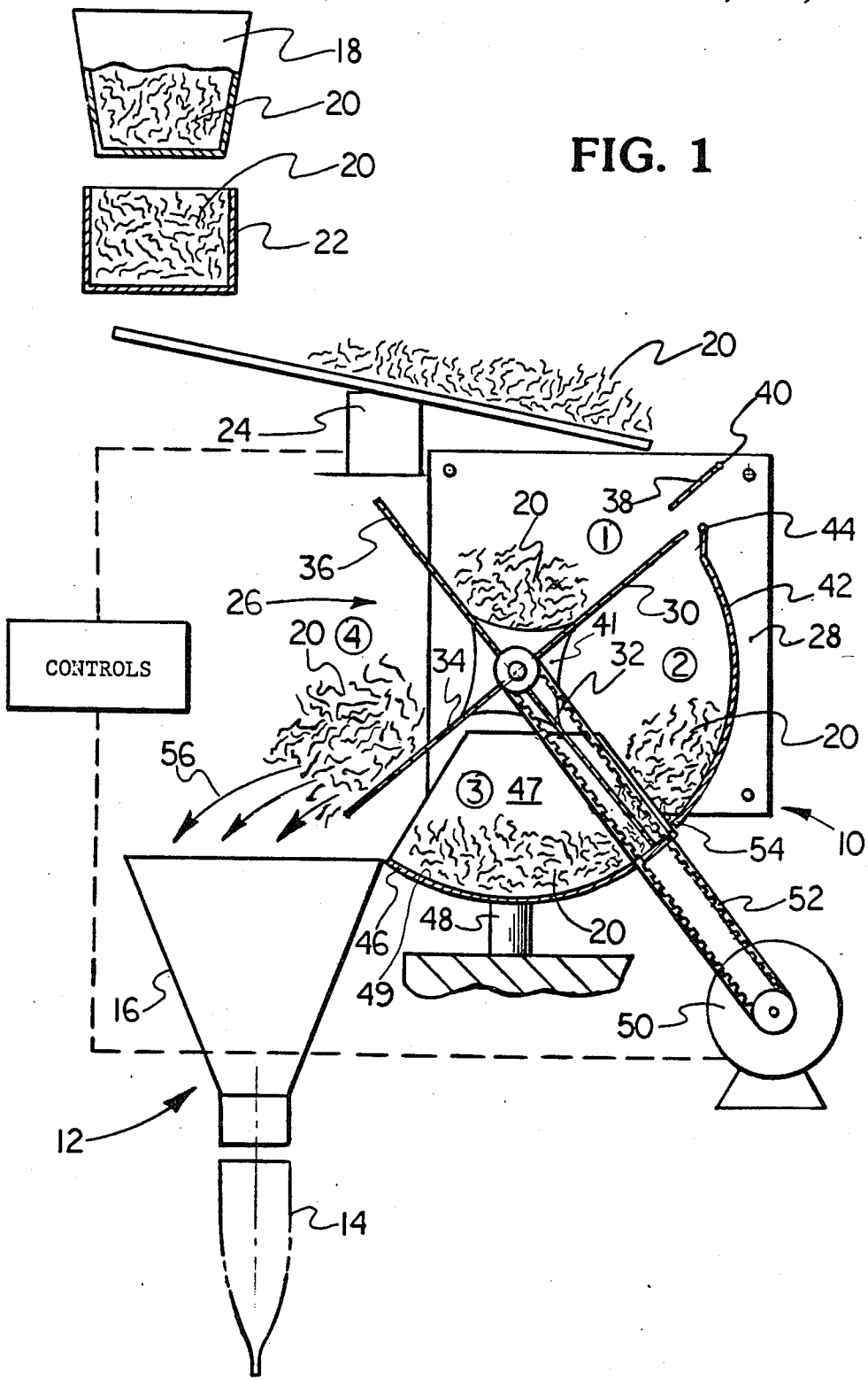
FIG. 1 is a side elevational view partially in section of the rotary paddle wheel and weighing bucket in a general packaging environment.

Attention is now directed to FIG. 1 which diagrammatically illustrates the weighing apparatus 10 used with an automatic packaging machine 12 for making packages 14 for holding snack foods such as pretzels generally illustrated at 20. The packaging machine can be of the type illustrated in U.S. Pat. No. 4,423,585 and would generally comprise an upwardly open funnel 16 which intermittently receives batches of weighted product 20 which pass down the funnel 16 into packages 14. The use of the weighing apparatus 10 is in the environment of a computer scales and is similar to that described in the commonly owned U.S. Pat. No. 4,591,012 and the disclosure therein is incorporated herein by reference.

The product is held in a central hopper 18 which periodically opens and transfers the product to a holding bin 22 from which the product is dropped onto a vibratory feeder 24 (all diagrammatically illustrated in FIG. 1). The vibrating feeder 24 is positioned above the rotary paddle wheel 26 carried between side plates 28 (only one of which is shown in FIG. 1). The paddle wheel 26 has a plurality of vanes 30, 32, 34 and 36 forming pockets 1, 2, 3 and 4 therebetween. The connection between the vanes 30–36 is through smooth rounded shoulders 41 to facilitate the gentle handling of fragile products.

Positioned above the paddle wheel 26 and adjacent the outlet of the vibratory feeder 24 is a spring plate 38 attached between the side plates 28 at 40. Also, attached between side plates 28 at 44 is an arcuate flexible backing member 42 which encloses pocket 2. The concave surface of backing member 42 is drawn on an arc having a center substantially at the center of paddle wheel 26. Positioned below the paddle wheel 26 and extending between the side plates 28 is the weighing bucket 46. The bucket 46 is supported on the load cell 48 which provides the machine control with an electrical signal representative to the weight of the product in the bucket.

The weighing bucket 46 has side walls 47 (one shown in FIG. 1) and a smooth concave bottom 49 drawn on an arc having a center substantially at the center of the paddle wheel 26. The paddle wheel 26 is driven by servo motor 50 through a timing belt 52. In the machine set-up, the servo motor drives the paddle wheel the proper speed for filling the desired number of bags per minute and then the amplitude of the vibrating feeder is adjusted to obtain the right amount of product into the pocket 1. It should also be noted that the lower edge 54 of the backing member 42 extends beyond the surface of the weighing bucket 46 so that on machine set-up, all the paddle wheels can be rotated counter-clockwise until a vane strikes the edge 54 to place all the paddle wheels in the same position.

With the above described rotary feeder, the product is transferred from the vibratory feeder against the spring plate 38 and gently falls into the accumulating pocket 1 between the vanes 30 and 36. During this stage of handling the product, the product does not impinge directly against any surface thus, minimizing breakage of fragile products, such as pretzels.

As the paddle wheel 26 is rotated, the product is placed in the position of holding pocket 2. Further rotation of the paddle wheel will place the product in the weighing bucket 46. In the meantime, additional product is being carried in the accumulating and holding pockets 1 and 2. As the machine control calls up the weight in the particular bucket 46, the paddle wheel 26 will be rotated and the vane 32 (as shown in FIG. 1) will sweep the product out of the weighing bucket by a vectoring effect illustrated by arrow 56 and into a downstream processing station, such as funnel 16. The vane 32 not only empties but also cleans the weighing bucket, and at the same time, the vane 30 will place the product in holding pocket 2 into the weighing bucket 46.

It can thus be seen that by a two step process of handling the product from the accumulating pocket 1 to holding pocket 2 and then into the weighing bucket, a more gentle handling of fragile products is accomplished.

In accordance with this invention, the weighing bucket 46 is not in contact with other parts of the apparatus and thus can be rigid and free of moving parts so that the bucket possesses a high natural frequency to reduce low frequency disturbances in the signal of load cell 48. Moreover, with the use of the vanes on the paddle wheel, the bucket can be easily filled and emptied in a reduced time period making the scale faster than prior devices as well as more accurate.

We claim:

1. A product handling and weighing apparatus comprising:
   a. a weighing bucket having a smooth concave bottom and upstanding side walls;
   b. a paddle wheel having spaced interconnected vanes forming product pockets therebetween; and
   c. a concave backing member adjacent said weighing bucket and coacting with said vanes to form a holding pocket for the product prior to entry into the weighing bucket.

2. The product handling and weighing apparatus of claim 1 wherein the interconnection of said vanes is a smooth arcuate surface providing a dish shaped pocket between said vanes.

3. The product handling and weighing apparatus of claim 1 wherein the curvature of said backing member is drawn on an arc having a center substantially at the center of said paddle wheel.

4. The product handling and weighing apparatus of claim 3 wherein said backing member is flexible.

5. The product handling and weighing apparatus of claim 4 wherein said backing member has a lip portion abutable by said vanes when said paddle wheel is rotated opposite its working direction.

6. The product handling and weighing apparatus of claim 1 wherein the curvature of the bottom of said weighing bucket is drawn on an arc having a center substantially at the center of said paddle wheel.

7. The product handling and weighing apparatus of claim 1 including a resilient plate against which the product is impinged before receipt into a product pocket.

* * * * *